Oct. 18, 1960 E. E. ISGREN ET AL 2,956,646
WHEEL CHOCK
Filed April 16, 1958
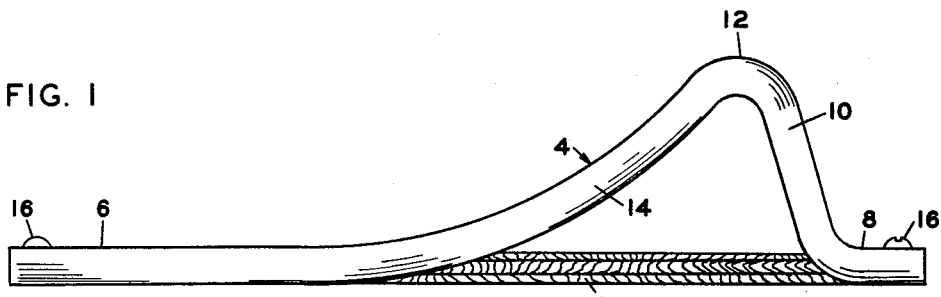
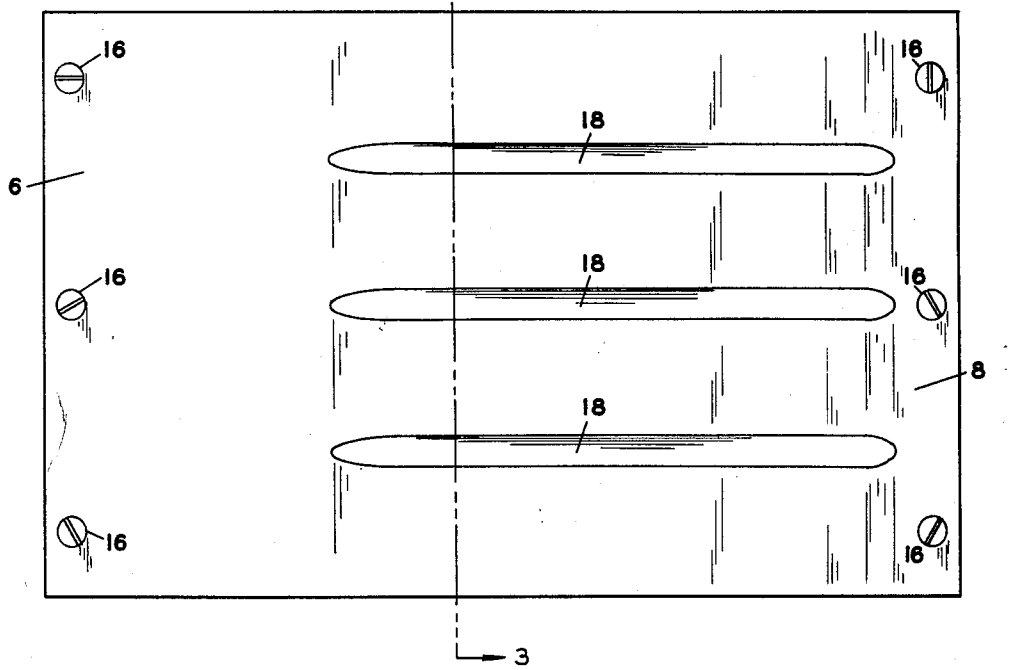
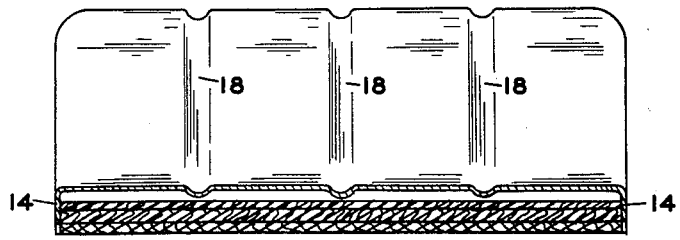
INVENTORS:
ELMER E. ISGREN
HAROLD W. JETER
BY
John F. Schmidt United States Patent Office 2,956,646
Patented Oct. 18, 1960

2,956,646
WHEEL CHOCK

Elmer E. Isgren, 104 Hollyridge Circle, and Harold W. Jeter, 6116 Oak Point Court, Mount Hawley Road, both of Peoria, Ill.

Filed Apr. 16, 1958, Ser. No. 728,845

3 Claims. (Cl. 188—32)

This invention relates to a wheel chock, especially to a chock for one or more wheels of a vehicle which is to be parked in a rather limited space.

The trend in the automobile industry is toward bigger and bigger vehicles. Automobiles get lower with the advent of each new model, but they also get longer and wider. Consequently, garages which were ample for the car of ten years ago are just barely big enough for today's new car. Labor and material costs are so high that it is not feasible to remodel the garage every few years. Even in the construction of new garages, building costs are so high that the building of a new garage that is "plenty big enough" for the car and for a few garden tools becomes almost prohibitive.

The advent of the tight-fitting garage presents even the most careful and skillful driver with the problem that used to be the topic of jokes about teen-age and women drivers, namely the problem of getting the car in far enough to allow the door to be closed but without knocking out the end wall with the front bumper of the car. When the inside length of the garage is only a foot or so more than the overall length of the car, the precise location of the automobile in the garage becomes exceedingly important. Moreover, it is not practical for the driver to get in and out of the car several times while he or she tries to locate the vehicle properly. For one thing, the car is so wide in relation to the garage that it is often impossible to open any car door wide for easy ingress and egress, with the result that the driver must "squeeze" in and out through a very narrow opening. In the second place, even if there were ample door space, getting in and out two or three times to get the car into just the right location in the garage would be time consuming, not to say exasperating.

It is accordingly an object of this invention to provide a wheel chock which will enable even an unskilled driver to locate his automobile accurately in a limited space without "trial-and-error" methods. It is also an object to provide such a wheel chock which can be inexpensively manufactured and which can be easily moved if desired.

In the drawings:

Fig. 1 is a side elevation view of one embodiment of the invention;

Fig. 2 is a top plan view of the embodiment shown in Fig. 1; and

Fig. 3 is a view in section on line 3—3 of Fig. 2.

In the preferred embodiment shown in the drawings, a base 2 is provided for securing to the garage floor and for the precise location of the ramp member indicated generally at 4. Base 2 is preferably of a durable but inexpensive material, and is here shown as a piece of plywood.

Ramp member 4 is a wheel-engaging member, as will be understood by those skilled in the art. The member 4 has floor-supported portions or ends 6 and 8, one of which is tangential or substantially horizontal as shown at 6. Between the ends 6 and 8, there is a peak portion or ridge 10 having a tip 12 which is situated at a substantial elevation above the horizontal or tangential end 6. By "substantial" is here meant such as would make the tip an obstacle to the wheel of a very slowly moving automobile which it would not be likely to over-ride when driven by a driver of average prudence and caution. It has been found that a tip height of three to four inches from the floor is adequate for automobiles equipped with 14 or 15 inch wheels. However, for a household with one or more drivers of considerably less than average care, a tip height of five or six inches might be desirable.

The length of the "approach" or tangential portion is preferably such as to permit the vehicle to be stopped easily with the wheel resting on the end portion 6. A horizontal length of approximately a foot from the extreme front end to the peak tip will usually be found sufficient for 14 or 15 inch wheels. The contour of this portion preferably approximates the contour of a pneumatic tire for such a wheel.

Ramp member 4 is preferably provided with depending flanges 14 which, at least in the vicinity of ends 6 and 8, shield the edges of base 2 and serve to locate the ramp member accurately on the base. Means are provided removably to secure the ramp member to the base, the means here shown consisting of screws 16.

In the preferred embodiment of the invention here shown, the ramp or wheel-engaging member 4 is of sheet metal. The high corrosion resistance of aluminum makes it a desirable material where moisture due to rain, ice, or snow is a factor to be considered, although of course other materials will suggest themselves to those skilled in the art. The metal should also be one which can readily be formed in a die, in order to keep production costs to a minimum. The embodiment of the drawings shows a plurality of ribs 18 in the die-formed ramp member. These ribs give the member strength and permit the use of a thinner gage of sheet metal than might otherwise be feasible.

In use, the base 2 is secured in any suitable way to the garage floor. A plywood base is readily cemented to a concrete floor. The location is determined by carefully locating the automobile in its preferred position, and by carefully driving the locator wheel onto the chock as it lies loose on the floor. After the base 2 is cemented to the floor, member 4 is screwed into place (if it is not already on the base). Then the driver need only "aim" for the chock, and when the wheel comes against the stop, he knows the car is properly placed. If desired, two or more chocks may be used side-by-side.

It will ordinarily be easier for the driver to "hit" the chock or chocks with the left front wheel, but of course any other wheel may be selected as the locator wheel if desired.

With the base 2 made of a relatively inexpensive material such as plywood, it may be considered expendable. Accordingly, if the family buys a new car which requires re-locating the wheel chock, it is of no great consequence if the base 2 should happen to be broken in the attempt to move it. Another base can be easily made at the cost of just a few cents.

It will be apparent that there is here disclosed a device which will enable a family of average means to park a car in a garage which is just barely big enough. It will also be evident that the device is simple and inexpensive to manufacture. Other advantages will be apparent to those skilled in the art.

While there is here shown one form which the invention may take, it will be understood that this form is shown for the purpose of illustration, and that the invention may be modified and embodied in various other forms

What is claimed is:

1. A wheel chock comprising: a base adapted to be secured to a garage floor; a ramp member of a size sufficient completely to cover the base, comprising spaced ends adapted to contact the base, the ramp member including a substantially horizontal portion adjacent one of the ends adapted to receive a vehicle wheel at rest, and a peak portion between the horizontal portion and the remaining one of the ends, the peak portion having a curved face to receive a vehicle wheel and tangent to the horizontal portion to form a smooth, continuous surface from end to end of the ramp; and means removably securing the ramp member to the base.

2. A wheel chock comprising: an expendable base adapted to be secured to a garage floor; a ramp member having spaced ends adapted to contact the base, the ramp member including a substantially horizontal portion adjacent one of the ends adapted to receive a vehicle wheel at rest, a wheel-stopping peak portion between the horizontal portion and the remaining one of the ends, and depending flanges covering the sides of the base at the ends; and means removably securing the ramp member to the base.

3. A wheel chock comprising: an expendable base adapted to be secured to a garage floor; a ramp member of a size sufficient completely to cover the base and comprising spaced ends adapted to contact the base, the ramp member including a substantially horizontal portion adjacent one of the ends adapted to receive a vehicle wheel at rest, a curved peak portion between the horizontal portion and the remaining one of the ends, reinforcing ribs spanning the entire peak portion, and depending flanges covering the sides of the base at the ends, the peak portion having a curved face to which the horizontal portion is tangent; and means removably securing the ramp member to the base.

References Cited in the file of this patent

UNITED STATES PATENTS

| | | |
|---|---|---|
| 1,076,152 | Rode | Oct. 21, 1913 |
| 1,617,369 | Blakely | Feb. 15, 1927 |
| 1,662,159 | Michod | Mar. 13, 1928 |
| 1,849,964 | Snyder | Mar. 15, 1932 |
| 1,912,038 | Irish | May 30, 1933 |
| 2,723,005 | Wink | Nov. 8, 1955 |